United States Patent [19]
Davis

[11] 3,970,899
[45] July 20, 1976

[54] INTEGRATED CIRCUIT LINEAR TIME DELAY EXTENDER FOR STATIC RELAYS

[75] Inventor: Lee A. Davis, Audubon, N.J.
[73] Assignee: I-T-E Imperial Corporation, Spring House, Pa.
[22] Filed: Feb. 3, 1975
[21] Appl. No.: 546,622

[52] U.S. Cl............................. 317/33 R; 317/36 TD
[51] Int. Cl.² ........................................... H02H 3/08
[58] Field of Search .......... 317/33 R, 36 TD, 141 S; 307/293 G, 235 N, 252 F

[56] References Cited
UNITED STATES PATENTS
3,766,436  10/1973  Zocholl............................. 317/33 R
3,859,543  1/1975  Milovancevic................ 317/141 S X OTHER PUBLICATIONS
"Getting Extra Control Over Output Periods of IC Timer," Electronics – Sept. 19, 1974, p. 112.

"Versatile IC Timer," Popular Electronics, July 1973, pp. 98–99.

Primary Examiner—Harry Moose
Attorney, Agent, or Firm—Ostrolenk, Faber, Gerb & Soffen

[57] ABSTRACT

A static relay utilizing a resistance-capacitance network to provide a current-time characteristic which has an inverse relationship for appropriately controlling protective operations in power transmission and distribution networks. An integrated dual-threshold and clamp circuit is employed in the static relay to adjustably control the time delay characteristic of the network over a range of several orders of magnitude without altering the time delay wave shape or requiring matched components and incorporates linear time setting means to facilitate adjustment and usage of the static relay.

10 Claims, 3 Drawing Figures

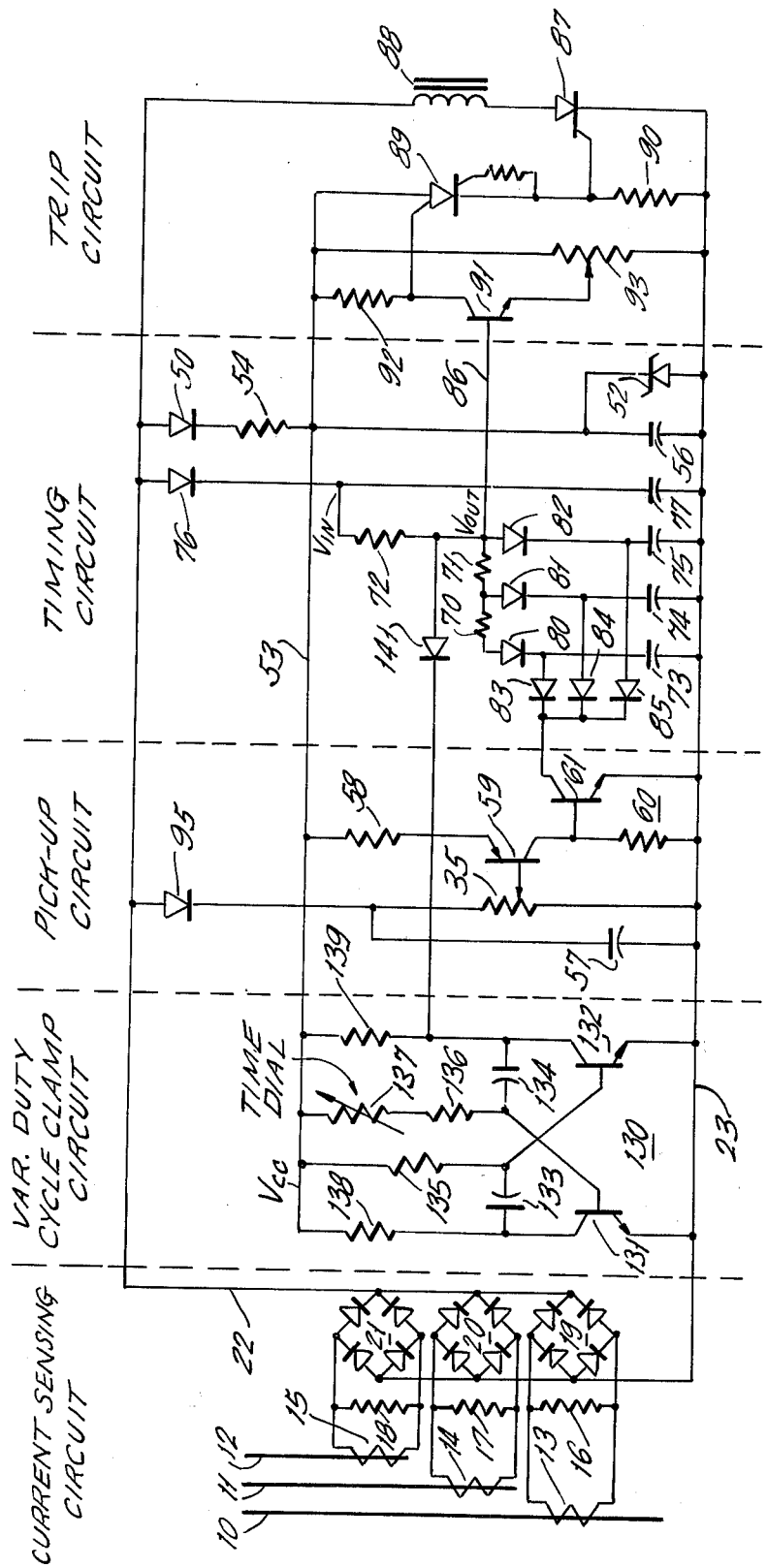

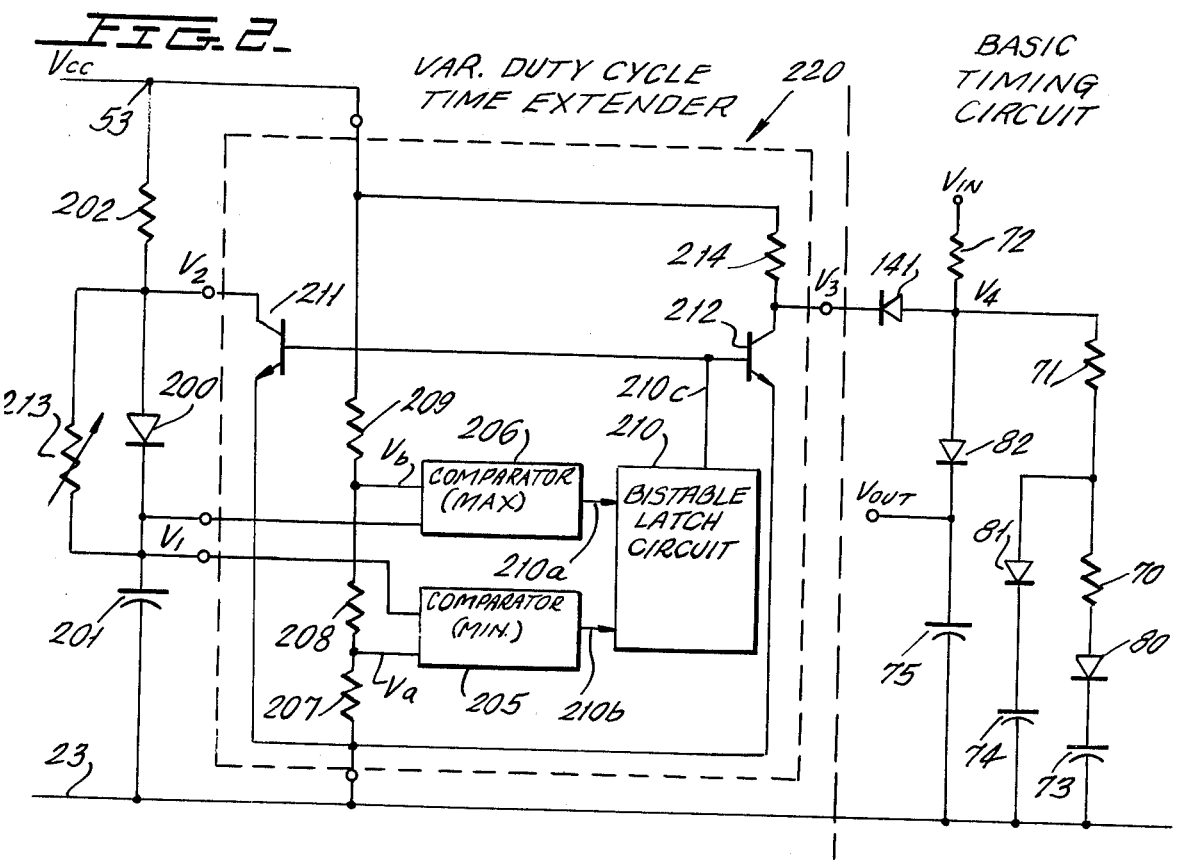
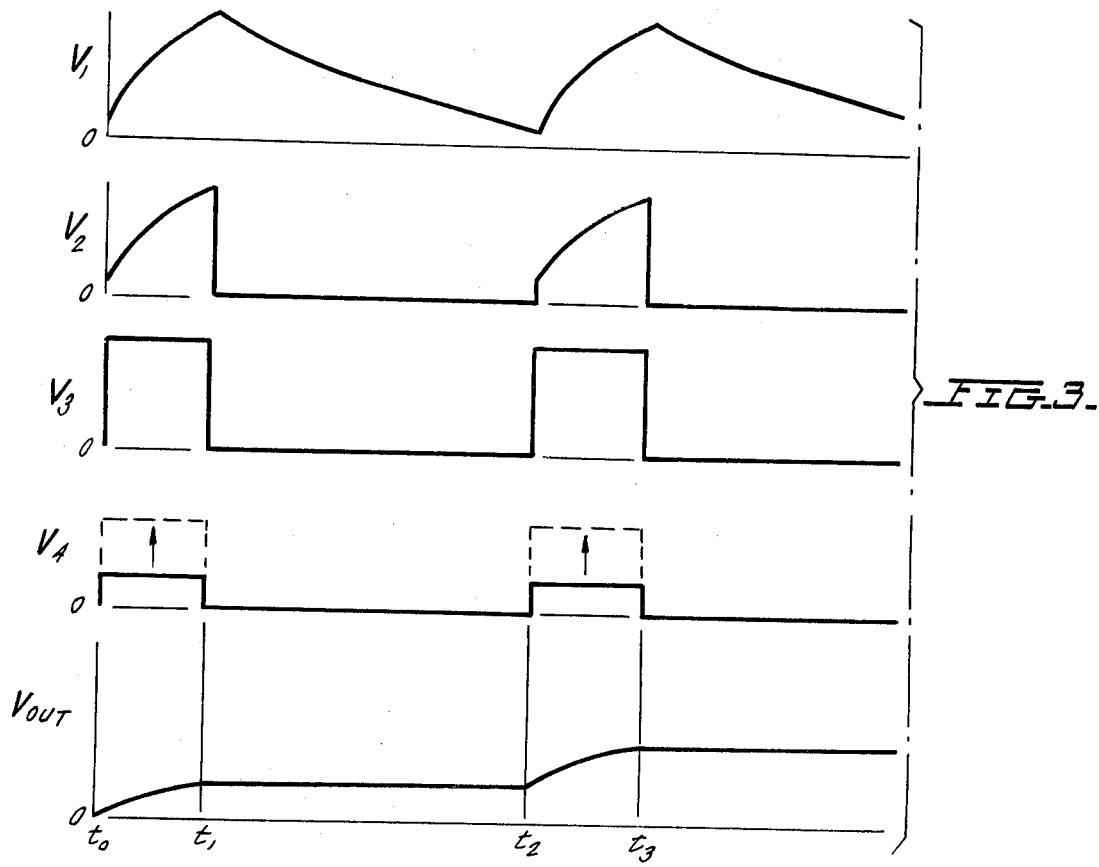

INTEGRATED CIRCUIT LINEAR TIME DELAY EXTENDER FOR STATIC RELAYS

BACKGROUND OF THE INVENTION

The present invention relates to static relays and more particularly to a novel dual-comparator and clamp circuit for simplified linear adjustment of the static relay time delay period over a multiple order of magnitude range without altering the basic charging curve of the delay network.

The present invention is an improvement of the static relays described and claimed in U.S. Pat. Nos. 3,319,127, issued May 9, 1967; 3,573,555, issued Apr. 6, 1971; and 3,766,436, issued Oct. 16, 1973, all of which are assigned to the assignee of the present invention.

The above-indicated patents describe static relay devices having an inverse time-current characteristic and which replace electromechanical relays which were previously employed to obtain the desired characteristic. The static relay devices of the above patents essentially comprise a pick-up circuit which is connected to the circuit being monitored; a timing circuit which is charged from the pick-up circuit when the circuit being monitored develops or otherwise generates an output which exceeds a known threshold value according to a predetermined inverse current-time characteristic so as to activate the pick-up circuit; and a tripping circuit which is operated in accordance with the inverse time-current relationship of the timing circuit so as to be tripped when the output of the timing circuit reaches the tripping threshold of the tripping circuit. The characteristic of the timing circuit is related to the circuit being monitored such that when the condition of the circuit being monitored exceeds a predetermined value over time intervals associated therewith a tripping operation is performed. It should be understood, in this respect, that overcurrent conditions of small magnitude must persist for a greater time interval to initiate a tripping operation and conversely overcurrent conditions of large magnitude will cause faster time-out of the timing circuit to cause initiation of the tripping operation.

It is desirable to provide such static relays with the capability of being adjusted over extremely large time delay ranges of several orders of magnitude, e.g., 1000:1 or 10,000:1.

One technique, described in U.S. Pat. No. 3,573,555, utilizes a variable duty-cycle free-running multivibrator circuit powered by the line being monitored, having "on" and "off" time periods which are adjustable over a substantial time range without altering the desired curve shape of the time-current characteristic. This adjustment, in accordance with an adjustable resistance element and a time dial setting knob provided therewith, resulted in an impractical and non-uniform inverse marking of the potentiometer dial and was extremely complex and tedious to design, assemble, and use. A later technique, described in U.S. Pat. No. 3,766,436, utilizes a variable duty-cycle free-running multivibrator circuit powered by the line being monitored, having a substantially constant "off" time interval and adjustable "on" time intervals to provide a substantially linear adjustable time range extension ratio and time dial therefor.

However, the variable duty-cycle clamp circuit of U.S. Pat. No. 3,766,436 has a maximum adjustment range of approximately fifteen times the base charging rate of the basic time delay network. To obtain a 5% unit-to-unit repeatability of the time extension previously realized by the use of this multivibrator, the circuit of the last-mentioned patent requires closely matched transistors and capacitors, which matching procedure is extremely tedious and costly.

BRIEF DESCRIPTION OF THE INVENTION

It is desirable to extend the charging time of the basic resistance-capacitance timing circuit over a range of at least four orders of magnitude greater than the base charging rate while maintaining a linear extension ratio adjustment and without requiring the use of closely matched components in the time delay extender, thus simplifying the design, assembly, and operation of the device while lowering the cost thereof.

The integrated circuit linear time delay extender of the present invention employs a dual-threshold and clamp circuit design having a fixed resistance element whose resistance provides substantially constant "on" time intervals and an adjustable resistance element whose resistance may be simply and readily adjusted by an adjustable control having linear (i.e., equally spaced) graduations or markings, which adjustable resistance provides adjustable "off" time intervals resulting in an adjustable duty-cycle which makes it possible to provide a static relay having a multiple-order-of magnitude time delay adjustment range adjusted by setting an essentially completely linear time dial. The dual-threshold and clamp design, contrary to the design employed in the abovementioned U.S. Pat. Nos. 3,573,555 and 3,766,436, provides time extension ranges of at least several orders of magnitude greater than the base charging rate of the basic time delay network and, contrary to the design employed in the last mentioned U.S. patent, provides substantially constant "on" time intervals and adjustable "off" time intervals.

Accordingly, a primary object of this invention is to provide novel means for extending the time delay range of a static relay.

Another object of this invention is to provide novel means for such extension over a range of several orders of magnitude.

A further object of this invention is to provide a novel means having an adjustable "off" timing interval for such extension.

A still further object of this invention is to provide such novel adjustable time delay means which significantly simplifies both the design and operation of a static relay.

It is still another object of this invention to provide a novel variable duty-cycle dual-threshold and clamp circuit to enable such time delay extension means.

These as well as other objects of the invention will become apparent from the following description of the accompanying drawings.

BRIEF DESCRIPTION OF THE DRAWINGS

FIG. 1 is a schematic diagram of a static relay of the type described in U.S. Pat. No. 3,766,436;

FIG. 2 is a schematic diagram of a variable duty-cycle dual-threshold and clamp circuit in accordance with the present invention and the timing circuit portion of a static relay with which it is used; and FIG. 3 illustrates the various waveshapes of the variable duty-cycle dual-threshold and clamp circuit of the present invention at circuit terminals as indicated in FIG. 2.

DETAILED DESCRIPTION OF THE INVENTION

FIG. 1 shows a static relay of the type described in U.S. Pat. No. 3,766,436. Since this circuit is described in detail in the aforesaid patent, only a brief description of its operation will be given for purposes of simplicity.

If a fault or overload current is developed in any one or more of the three lines 10, 11, and 12 being monitored, the maximum voltage condition, after a.c. to d.c. conversion, appears across buses 22 and 23. The d.c. voltage, in addition to being the level to be monitored provides the operating power for the entire static relay, so that no other power source is required for operation of the device. The series connected circuit of diode 50, resistor 54 and zener diode 52, coupled across buses 22 and 23, establishes a constant voltage level ($V_{cc}$) on conductor 53. The series circuit composed of diode 95 and resistor 35 coupled across buses 22 and 23 applies a d.c. voltage level to the base of transistor 59. When this value exceeds the constant voltage reference value on line 53, transistor 59 is rendered non-conductive, causing transistor 61 to be rendered non-conductive. This removes a short-circuit condition from the cathode electrodes of diodes 80, 81, and 82, enabling the d.c. current from bus 22 through diode 76, resistor 72, and resistors 70 and 71 and diodes 80, 81, and 82 into capacitors 73, 74, and 75 to develop an output applied to the input line 86 coupled to the base of transistor 91 whose collector is coupled to the trigger electrode of a controlled rectifier 89 which is provided to conduct and hence trigger control rectifier 87 to energize a trip coil 88 when the value at line 86 reaches a predetermined threshold value which will require a longer time interval in the presence of overload currents of low magnitude and alternatively, a shorter time interval in the presence of overload current of significantly greater magnitude.

In order to provide a time adjustment range over which the static relay may be operated, the variable duty-cycle clamp circuit 130 is provided. The circuit operates as a free-running multivibrator having constant "off" time intervals whose time duration is established by resistance element 135 and capacitive element 133, and having adjustable "on" time intervals whose time durations are controlled by the adjustment of adjustable resistance element 137. It can be seen, for example, that increasing the resistance of adjustable resistor 137 provides an increase of the time interval of the "on" time of the multivibrator and decreasing the resistance of resistor 137 provides a decrease of the time interval of the "on" time of the multivibrator, with essentially no effect on the time interval of the "off" time.

The circuit of FIG. 1 provides a linear arrangement for the adjustment of the time delay extension of the static relay but requires that the components determining "on" and "off" time intervals, particularly the capacitors 133 and 134 and the transistors 131 and 132, be closely matched in order that the multivibrator have a 5% repeatability from one unit to the next. Additionally, the range of adjustment is restricted to a maximum extension of approximately 15 times the base charging rate of the timing network due to the design restraints placed upon the allowable ratio of the maximum-to-minimum resistance of the "on" time interval setting resistances 136 and 137. The flow of saturation current into the base of transistor 131 through the adjustable "on" time interval resistance 137 requires that the sum of the resistances 136 and 137 be always less than or equal to the product of the collector resistance 138 and the d.c. common-emitter current gain factor of the transistor 131. To insure the recovery of the time-interval-determining circuitry before the circuit reswitches, the "on" resistance value must be greater than or equal to 5.8 times the value of the collector resistance 138. The ratio of the maximum-to-minimum resistances indicates that the maximum extension range achievable with the prior variable duty-cycle clamp circuit is $E' = 0.171 \times h_{FE}$ (where $E'$ is the maximum extension ratio achievable in the prior circuit and $h_{FE}$ is the d.c. common-emitter current gain of the transistor). Thus, the use of transistors 131 and 132 with a maximum $h_{FE}$ of 100 will result in a maximum extension range of approximately 17 times the base charging rate of the timing network.

FIG. 2 shows a dual-threshold and clamp circuit which replaces the variable duty-cycle clamp circuit 130 of FIG. 1 to overcome the requirement for matched components while allowing an extension ratio in excess of 10,000 times the base charging rate of the time circuit to be realized.

The constant voltage reference level on conductor 53, established as previously described, charges capacitor 201 through a diode 200 and a charging resistor 202. The voltage $V_1$ (refer to FIG. 3) across capacitor 201 increases at an exponential rate determined by the values of the capacitor 201 and the resistor 202. This voltage is coupled to both a trigger input of a minimum determining comparator 205 and a threshold input of a maximum-determining comparator 206. Two voltage reference levels are generated from the constant voltage level on conductor 53 by a reference voltage divider comprised of resistances 207, 208 and 209. A minimum-voltage reference level, $V_a$, is developed across resistance 207 and is coupled to the reference input of the minimum-determining comparator 205 which develops an output signal when the trigger input, being that voltage across the timing capacitor 201, has decreased to a value less than the voltage level appearing across resistor 207. A maximum-reference voltage level, $V_b$, developed across series-connected resistors 207 and 208, is coupled to the reference input of the maximum-determining comparator 206 which develops an output when the threshold input, i.e., the voltage appearing across the timing capacitor 201, has increased to a value greater than the reference voltage $V_b$.

The output of the maximum-determining comparator 206 is coupled to the setting input 210a of a bistable latch circuit 210, whose output is thereby set to a first voltage level and causes both discharge transistor 211 and clamp transistor 212 to conduct. The collector of the discharge transistor 211 reverse biases diode 200 by switching the anode voltage $V_2$ thereof to ground potential. The flow of current from $V_{cc}$ is shunted through transistor 211, which also discharges capacitor 201 through adjustable resistance 213, and transistor 211 to ground bus 23. The timing capacitor voltage $V_1$ exponentially decreases at a rate determined by the values of the timing capacitor 201 and the discharge resistor 213 until a trigger voltage equal to the minimum reference voltage $V_a$, across resistor 207, is reached causing the output of minimum-determining comparator 205, coupled to reset input of the flip-flop 210, to reset output 210c to the zero voltage level, whereby the base-emitter junctions of both discharge and clamp transistor 211 and 212 are reverse-biased and switched to the non-conducting state. The cut-off discharge transistor 211 removes the zero-potential short circuit from the anode of diode 200, current to flow through charging resistor 202 and forward biased diode 200 into timing capacitor 201, whose voltage $V_1$ begins to exponentially increase and the charge-discharge cycle just described is repeated as long as constant voltage line 53 is energized.

During the charging time $T_1$ of timing capacitor 201, clamp transistor 212 is cut off which causes the extender diode 141 to be reverse-biased and permits the timing network intermediate voltage $V_4$ to rise. During the discharge portion of the cycle, the collector of clamp transistor 212 goes to zero. Hence $V_3$ is at zero potential and the extender diode 141 is forward-biased by the application of the timing circuit input voltage $V_{in}$ to its anode through resistor 72. The timing circuit input voltage $V_{in}$ is the current-sensing circuit voltage on bus 22 minus the voltage drop across diode 76. While diode 141 is forward-biased, the timing circuit intermediate voltage $V_4$ is essentially zero and reverse-biases each of the timing circuit diodes 80, 81, and 82, thereby preventing any change of the voltage appearing across each of the three timing circuit capacitors 73, 74, and 75. Thus, it is seen that the timing circuit output voltage $V_{out}$ increases at a rate determined by the time-current characteristic of the timing circuit during the charging or "on" time interval and maintains the previous voltage level during the discharge or "off" time interval, thereby increasing the time required for the timing circuit output voltage $V_{out}$ to rise to the trip level by an extension ratio E equal to the ratio of the total time period $T_2$ to the "on" time interval $T_1$.

Turning now to a consideration of linearity and adjustment range of the variable duty-cycle time extender of FIG. 2;

Let $T_0$ be the base charging rate of the basic timing circuit $T_1$ be the "on" time of the variable duty-cycle time extender circuit of the invention $T_2$ be the total time period for one cycle of the extender circuit, and $T_e$ be the extended charging time of the basic timing circuit operated on by the variable duty-cycle time extender circuit. Therefore, using the above reasoning and notation:

$$T_e = (T_2/T_1) \times T_0 \qquad (1)$$

$$E = (T_e/T_0) = T_2/T_1 \qquad (2)$$

As $T_1$, the "on" time, is a first constant $(k')$, then $$E = (T_2/k') = k \times T_2 \qquad (3)$$

where $k$ is the reciprocal of $k'$ and is a second constant.

During the "on" time interval:

$$V_1 = Va + (Vcc - Va)(1 - e^{-t/R_1C}) \qquad (4)$$

where $Vcc$ is the substantially constant voltage maintained on bus 53 by zener diode 52
201 is a capacitor having capacitance value $C$
202 is a resistor having resistance value $R_1$; when $V_1$ is equal to $Vb$, $$T_1 = R_1C \ln[(Vcc-Va)/(Vcc-Vb)] = A \text{ (a third constant)} \qquad (5)$$

During the "off" time interval:

$$V_1 = Vb(e^{-(t-s)/R_2C}) \qquad (6)$$

where 213 is a resistor of value $R_2$; when $V_1$ is equal to $Va$, $$T_2 = R_2C \ln(Vb/Va) + T_1 \qquad (7)$$

substituting (5) in (7)

$$T_2 = R_2 B + A \qquad (8)$$

where $B = C \ln(Vb/Va)$ is a fourth constant. Then, from (3), (5) and (8), $$E = T_2/T_1 = 1 + XR_2 \qquad (9)$$

where $X = B/A = $ a fifth constant.

When $R_2$ is zero, $E = 1$ (no extension of the basic charging rate) which is the predictable delay attributable to the discharge time of a short-circuited capacitor. If $R_2$ is increased in steps of value equal to $(1/X)$, i.e., a constant increase of resistance, then $E = 1 + N$ where $N$ is an integer step of "off" resistance 213. The resistance value of resistor 213 may be incremented by any method which indicates and yields linear resistance steps. To obtain equal time separations, the values of $R_2$ must be in equal resistance separations. This states that equal resistance steps for $R_2$ will produce equal steps in the time delay for the basic timing circuit. If a potentiometer is used for $R_2$, the dial markings will be linear since linear resistance changes produce linear time delays.

In a preferred embodiment, an integrated circuit contains the flip-flop 210, the transistors 211 and 212, the comparators 205 and 206, and the resistances 207, 208, 209, and 214. The limiting parameters of the integrated circuit embodiment of the present invention are the leakages of the capacitors 73, 74, and 75 in the timing circuit and the maximum value of the adjustable duty-cycle resistance 213 that will cause the integrated circuit to cease operation. It has been found that an extension range $E$ in excess of 10,000 times greater than the base charging rate can be realized.

There has just been described a novel integrated circuit time delay extender for a static relay which provides linear control settings with linear adjustable resistance changes to produce linear time delay extensions.

Although there has been described a preferred embodiment of this novel invention, many variations and modifications will now be apparent to those skilled in the art. Therefore this invention is to be limited, not by the specific disclosure herein, but only by the appended claims.

What is claimed is:

1. an improved static relay of the type having a time delay network whose output increases with time according to a first predetermined curve after an input terminal of said time delay network is coupled by a pickup circuit to a current-sensing circuit when the output of said current-sensing circuit reaches a first pickup level and output circuit means is energized at the end of a first time interval required for said time delay network output to exceed a first predetermined value, wherein the improvement comprises:
- first means for providing a substantially constant supply voltage level;
- charging means coupled to said first means for charging at a first rate;
- second means coupled to said charging means and activated in response to said charging means reaching said first predetermined charging level for suspending the charging of said time delay network;
- fourth means coupled to said charging means for deactivating said second and third means when said charging means has discharged to a second predetermined level to thereby enable said time delay network and said charging means to resume charging.

2. An improved static relay as set forth in claim 1, wherein said first predetermined charge level is greater than said second predetermined discharge level.

3. An improved static relay as set forth in claim 1, wherein said second means further comprises adjustable resistance means for setting said adjustable discharge rate between a minimum and a maximum discharge rate, wherein said minimum discharge rate is at least 10,000 times longer than said first charging rate and an essentially instantaneous maximum discharge rate.

4. An improved static relay as set forth in claim 3, wherein said charging means comprises:
- a capacitance element having a first and a second terminal and a fixed capacitance value;
- a first resistance element having a first and a second terminal and a first fixed resistance value, said first resistance element first terminal being coupled to said first means; and
- a first diode element having an anode and a cathode electrode, said first diode anode electrode being coupled to said first resistance element second terminal and said first diode cathode electrode being coupled to said capacitance element first terminal;
- said first charging rate being proportional to said fixed capacitance and said first fixed resistance values.

5. An improved static relay as set forth in claim 4, wherein said second means comprises:
- fifth means coupled to said first means for providing a first essentially constant reference voltage level;
- a first switching element having first, second and control electrodes, said first switching element first electrode being coupled to said first anode electrode, said first switching element second electrode being coupled to said capacitive element second terminal;
- said adjustable resistance means having a first and a second terminal, said adjustable resistance means first terminal being coupled to said first switching element first electrode, said adjustable resistance means second terminal being coupled to said first diode cathode electrode;
- a memory circuit having a set input, a reset input and an output, said memory circuit output being coupled to said first switching element control electrode and adapted to generate a signal responsive to said memory circuit set input being energized to enable said first switching element to form substantially a short circuit between said first switching element first and second electrodes for discharging said capacitive through said adjustable resistance means; and
- sixth comparison means coupled to said capacitance element first terminal and to said fifth means and activated when a first voltage level at said first capacitance element first terminal equals said first reference voltage level for energizing said memory circuit set input.

6. An improved static relay as set forth in claim 5, wherein said third means comprises:
- a second diode element having anode and cathode electrodes, said second diode anode electrode being coupled to said time delay network input terminal;
- a second switching element having first, second and control electrodes, said second switching element first electrode being coupled to said second diode cathode electrode; said second switching element control electrode being coupled to said memory circuit output;
- said second switching element forming substantially a short circuit between said second switching element first and second electrodes in response to said memory circuit output enabling signal, thereby forwardly biasing said second diode element to suspend charging of said time delay network.

7. A static relay as set forth in claim 6, wherein said fourth means comprises:
- seventh means coupled to said first means for providing a second essentially constant reference voltage level; and
- eighth comparison means coupled to said capacitance element first terminal and to said seventh means and activated when a second voltage level at said capacitance element first terminal equals said second reference voltage for energizing said memory circuit reset input;
- said memory circuit output being adapted to disable said first and second switching element control electrodes in response to the energization of said memory circuit reset input, thereby to enable said time delay network and said charging means to resume charging.

8. A static relay as set forth in claim 7, wherein said fifth and seventh reference voltage means, said first and second switching elements, said sixth and eighth comparison means and said memory circuit comprise an integrated electronic circuit.

9. An improved static relay as set forth in claim 7, wherein said adjustable resistance means further comprises:
- indicating means for adjustable selecting a desired extension time ratio for said time delay network in uniformly spaced increments, said selection means being coupled to an adjustable member of said adjustable resistance means;
- the uniformly spaced increments being obtained by the proportional relationship between the values of said first fixed resistance element ($R_1$) and said adjustable resistance means ($R_2$) given by the equation:

$$R_2 = (E-1) R_1$$

where $E = (T_2/T_1)$ is said extension time ratio equal to a desired time delay required for said time delay network output to exceed said first predetermined value divided by said first time interval of said time delay network, $T_1$ is a time interval during which said second switching element is non-conductive and $T_2$ is the total time interval for a conducting, non-conducting cycle of said second switching element.

10. The article of claim 10, wherein said adjustable resistance means is comprised of an electrical rheostat.

* * * * *